United States Patent
Ge

(10) Patent No.: US 8,242,816 B2
(45) Date of Patent: Aug. 14, 2012

(54) RESTART CIRCUIT OF SERVER

(75) Inventor: Ting Ge, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 45 days.

(21) Appl. No.: 12/982,917

(22) Filed: Dec. 31, 2010

(65) Prior Publication Data

US 2012/0166820 A1   Jun. 28, 2012

(51) Int. Cl.
*H03L 7/00* (2006.01)

(52) U.S. Cl. .......................... 327/143; 327/142
(58) Field of Classification Search .................. 327/142, 327/143, 198

See application file for complete search history.

(56) References Cited

U.S. PATENT DOCUMENTS

| 5,140,178 | A | * | 8/1992 | Yoshihara et al. | 327/198 |
| 5,313,112 | A | * | 5/1994 | Macks | 327/143 |
| 7,348,817 | B2 | * | 3/2008 | Laio et al. | 327/143 |
| 8,026,751 | B2 | * | 9/2011 | Wu | 327/198 |

* cited by examiner

*Primary Examiner* — Hai L Nguyen
(74) *Attorney, Agent, or Firm* — Altis Law Group, Inc.

(57) ABSTRACT

A restart circuit includes a voltage input terminal, a diode, an electronic switch, a restart signal output terminal, and a timing chip. The voltage input terminal is connected to an anode of the diode. A cathode of the diode is connected to a power pin and a reset pin of the chip and connected to a trigger pin of the chip through a resistor. A trigger pin of the chip is grounded through a capacitor. A count pin of the chip is grounded through a capacitor. A discharge pin and a threshold pin of the chip are connected and grounded through a resistor and a capacitor in that order. An output pin of the chip is connected to a control terminal of the switch. A first terminal of the switch is grounded. A second terminal of the switch is connected to the restart signal output terminal.

5 Claims, 1 Drawing Sheet

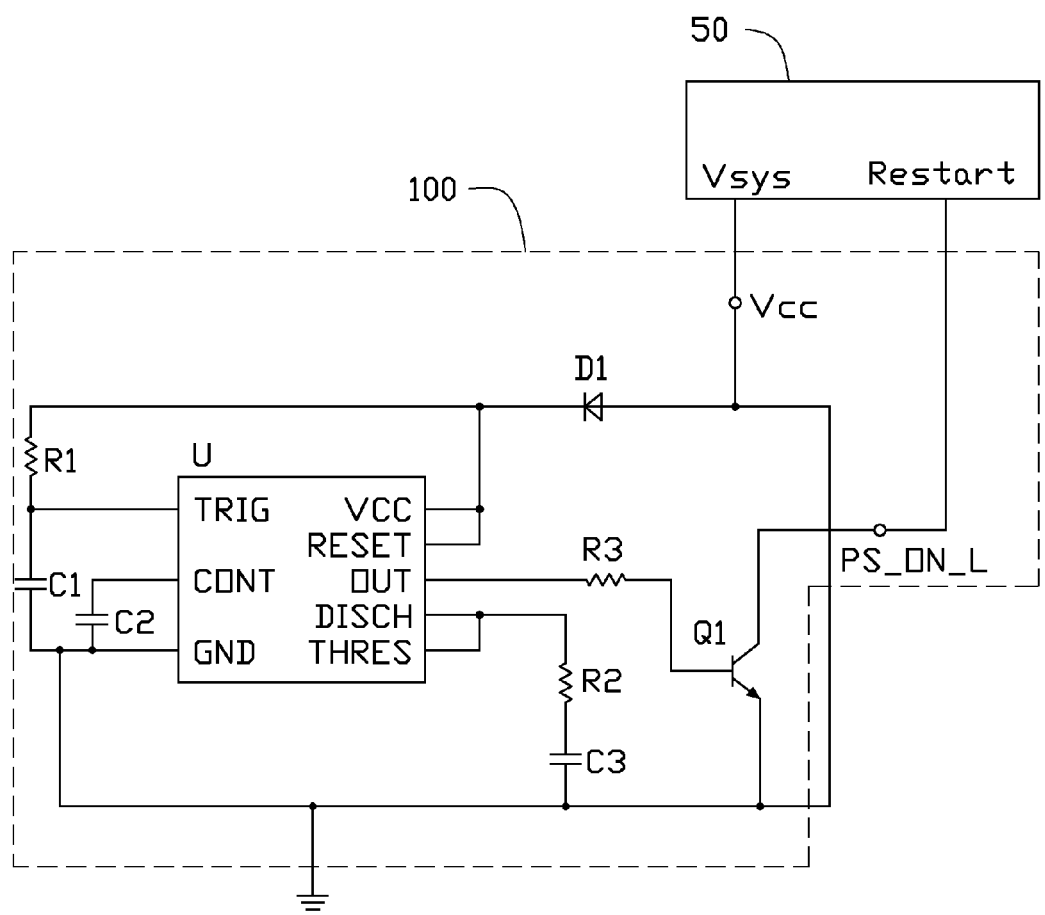

RESTART CIRCUIT OF SERVER

BACKGROUND

1. Technical Field

The present disclosure relates to a restart circuit for restarting a server when a power supply of the server is recovered.

2. Description of Related Art

Nowadays, servers are widely used in many fields. For servers that include an uninterruptible power supply (UPS), when the mains power is cut the UPS will continue to supply power to the servers. For servers without a UPS, the servers will be turned off when the external power supply is cut. However, when the external power supply is back on, the servers will not restart automatically, which is inconvenient.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

The drawing is a circuit diagram of an embodiment of a restart circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the drawing, an embodiment of a restart circuit 100 is provided to restart a server 50 when an external power supply of the server 50 comes back on after being cut-off. The restart circuit 100 includes a timing chip U, a voltage input terminal Vcc, a diode D1, a transistor Q1, three resistors R1-R3, three capacitors C1-C3, and a restart signal output terminal PS_ON_L. In one embodiment, the timing chip U is an NE555DR timing chip.

The voltage input terminal Vcc is connected to a voltage pin Vsys of the server 50, such as a 9 volt (V) voltage pin. The restart signal output terminal PS_ON_L is connected to a restart pin Restart of the server 50. In one embodiment, when the restart pin Restart of the server 50 receives a low voltage signal, such as 0V, the server 50 is restarted.

The voltage input terminal Vcc is connected to an anode of the diode D1. A cathode of the diode D1 is connected to a power pin VCC and a reset pin RESET of the timing chip U, and connected to a trigger pin TRIG of the timing chip U through the resistor R1. The trigger pin TRIG of the timing chip U is grounded through the capacitor C1. A count pin COUT of the timing chip U is grounded through the capacitor C2. A ground pin GND of the timing chip U is grounded. A discharge pin DISCH and a threshold pin THRES of the timing chip U are connected together and grounded through the resistor R2 and the capacitor C3 in that order. An output pin OUT of the timing chip U is connected to a base of the transistor Q1 through the resistor R3. An emitter of the transistor Q1 is grounded. A collector of the transistor Q1 is connected to the restart signal output terminal PS_ON_L. In other embodiments, the transistor Q1 also can be changed to other kinds of electronic switches, such as a metal oxide semiconductor field effect transistor.

In use, if the external power supply of the server 50 is cut, the server 50 will be turned off. When the external power supply is recovered, the voltage input terminal Vcc receives a 9V voltage signal, which triggers the timing chip U to work. The output pin OUT of the timing chip U outputs a high voltage signal, such as 5V, to the base of the transistor Q1 after a delay time. The transistor Q1 is turned on and the restart signal output terminal PS_ON_L is grounded, therefore the server 50 is restarted, which is very convenient.

In one embodiment, a resistance of the resistor R2 is about 180 kilohms (KM a capacitance of the capacitor C3 is about 40μ farads (μF). Therefore, the delay time can be calculated about 2 seconds (s). In other embodiments, the delay time can be changed by changing the resistance of the resistor R2 and the capacitance of the capacitor C3.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A restart circuit for a server, the restart circuit comprising:
    a voltage input terminal to receive a voltage signal;
    a diode;
    an electronic switch;
    first and second resistors;
    first to third capacitors;
    a restart signal output terminal connected to a restart pin of the server; and
    a timing chip comprising a power pin, a reset pin, a trigger pin, a count pin, a ground pin, a discharge pin, a threshold pin, and an output pin;
    wherein the voltage input terminal is connected to an anode of the diode, a cathode of the diode is connected to the power pin and the reset pin of the timing chip and connected to the trigger pin of the timing chip through the first resistor, the trigger pin of the timing chip is grounded through the first capacitor, the count pin of the timing chip is grounded through the second capacitor, the ground pin of the timing chip is grounded, the discharge pin and threshold pin of the timing chip are connected together and grounded through the second resistor and the third capacitor in that order, the output pin of the timing chip is connected to a control terminal of the electronic switch, a first terminal of the electronic switch is grounded, a second terminal of the electronic switch is connected to the restart signal output terminal, the electronic switch is turned on in response to the control terminal being at a high voltage state.

2. The restart circuit of claim 1, wherein the electronic switch is a transistor, the control terminal, the first terminal, and the second terminal are respectively corresponding to a base, an emitter, and a collector of the transistor.

3. The restart circuit of claim 1, wherein the voltage signal is 9 volts.

4. The restart circuit of claim 1, wherein a resistance of the second resistor is about 180 kilohms, a capacitance of the third capacitor is about 40μ farads.

5. The restart circuit of claim 1, further comprising a third resistor connected between the output pin of the timing chip and the control terminal of the electronic switch.

* * * * *